(12) United States Patent
Ikezawa et al.

(10) Patent No.: US 8,619,439 B2
(45) Date of Patent: Dec. 31, 2013

(54) FLYBACK BOOST CIRCUIT WITH CURRENT SUPPLIED TO SECONDARY SIDE OF TRANSFORMER CIRCUIT PRIOR TO BOOST OPERATION AND STROBE DEVICE USING THE SAME

(75) Inventors: Katsuya Ikezawa, Kanagawa (JP);
Kunio Kinoshita, Kanagawa (JP);
Takuya Takenaka, Kanagawa (JP);
Yasuhiro Yamawaki, Kanagawa (JP);
Tatsuo Kuroiwa, Kanagawa (JP)

(73) Assignee: Sony Corporation, Tokyo (JP)

( * ) Notice: Subject to any disclaimer, the term of this patent is extended or adjusted under 35 U.S.C. 154(b) by 978 days.

(21) Appl. No.: 12/461,452

(22) Filed: Aug. 12, 2009

(65) Prior Publication Data

US 2010/0061125 A1    Mar. 11, 2010

(30) Foreign Application Priority Data

Sep. 5, 2008  (JP) ................................. 2008-228320
Mar. 3, 2009  (JP) ................................. 2009-049569

(51) Int. Cl.
*H02M 3/335* (2006.01)

(52) U.S. Cl.
USPC ...................................................... 363/21.12

(58) Field of Classification Search
USPC ............ 363/20, 21.01, 21.17, 49, 97, 78, 95, 363/21.12–21.13
See application file for complete search history.

(56) References Cited

U.S. PATENT DOCUMENTS

| | | | |
|---|---|---|---|
| 5,099,191 A * | 3/1992 | Galler et al. | 323/313 |
| 5,903,066 A * | 5/1999 | Enjeti et al. | 307/105 |
| 6,487,059 B2 * | 11/2002 | Bontempo et al. | 361/90 |
| 7,298,632 B2 * | 11/2007 | Harris et al. | 363/21.01 |
| 2003/0025510 A1 * | 2/2003 | Ichimasa et al. | 324/547 |
| 2003/0099119 A1 * | 5/2003 | Yamada et al. | 363/21.12 |
| 2006/0043909 A1 * | 3/2006 | Hwang et al. | 315/276 |
| 2006/0239040 A1 * | 10/2006 | Fukumoto | 363/21.01 |
| 2010/0188871 A1 * | 7/2010 | Kim et al. | 363/21.03 |
| 2010/0220504 A1 * | 9/2010 | Kim et al. | 363/21.17 |

FOREIGN PATENT DOCUMENTS

| | | | |
|---|---|---|---|
| JP | 04-038481 A | | 2/1992 |
| JP | 2003-059689 | | 2/2003 |
| JP | 2003059689 A | * | 2/2003 |
| JP | 2004-071428 A | | 3/2004 |

OTHER PUBLICATIONS

Japanese Office Action issued Aug. 3, 2010 for corresponding Japanese Application No. 2009-049569.

* cited by examiner

*Primary Examiner* — Jue Zhang
*Assistant Examiner* — Henry Lee, III
(74) *Attorney, Agent, or Firm* — Rader, Fishman & Grauer PLLC (57) ABSTRACT

A flyback boost circuit includes an output voltage detection terminal provided to a secondary winding of a transformer of the flyback boost circuit, and configured to detect an output voltage. Prior to the start of a boost operation, current is supplied to a secondary side of the transformer via the output voltage detection terminal to detect a voltage generated at the output voltage detection terminal, to thereby detect an unwired state by determining whether or not there is floating of the output voltage detection terminal or a grounding terminal of the secondary winding of the transformer.

17 Claims, 6 Drawing Sheets

RELATED ART

FLYBACK BOOST CIRCUIT WITH CURRENT SUPPLIED TO SECONDARY SIDE OF TRANSFORMER CIRCUIT PRIOR TO BOOST OPERATION AND STROBE DEVICE USING THE SAME

BACKGROUND OF THE INVENTION

1. Field of the Invention

The present invention relates to a flyback boost circuit which boosts an input voltage by using a transformer, and which charges and outputs the boosted voltage to a load device, and a strobe device using the flyback boost circuit. The present invention particularly relates to the detection of the wiring state of an output voltage detection terminal on the secondary side of the transformer or a grounding terminal of a secondary winding of the transformer.

2. Description of the Related Art

Figure 6:
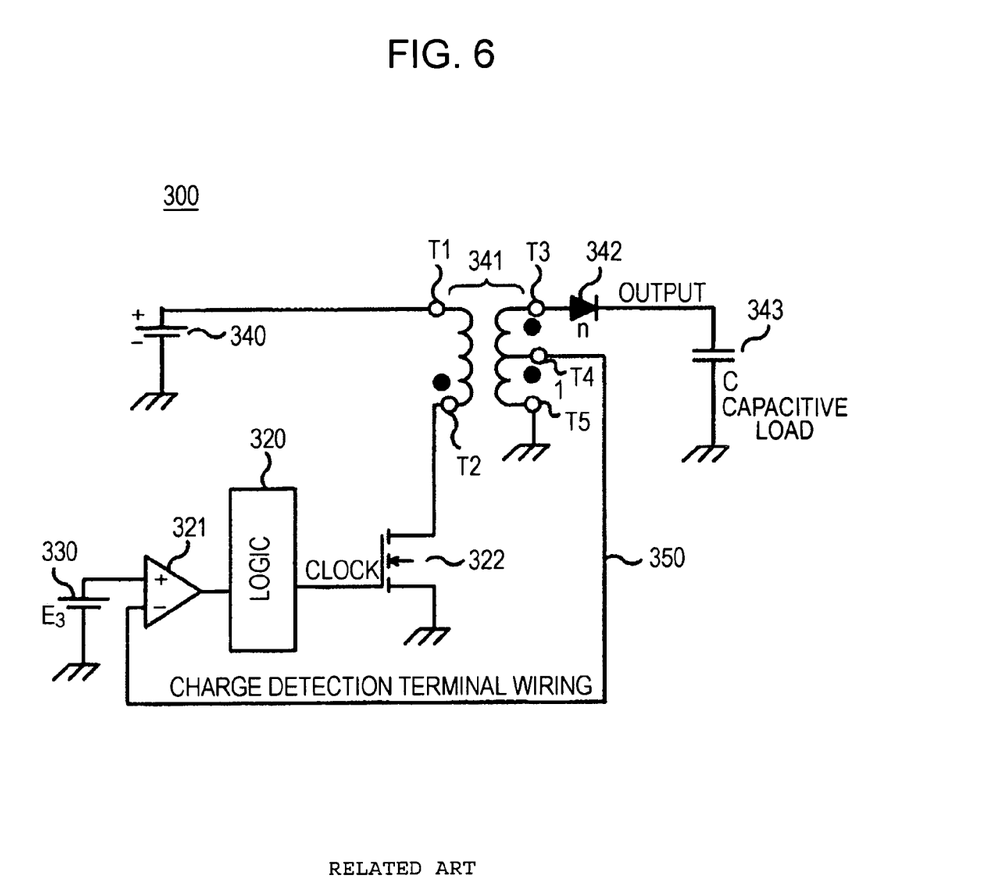
FIG. 6 is a circuit configuration diagram of a related art flyback boost circuit.

FIG. 6 illustrates a circuit configuration of a flyback boost circuit 300 of a related art example. When a clock signal output from a logic circuit 320 is supplied to the gate of an N-channel FET 322, the N-channel FET 322 repeats an ON-OFF operation. When the N-channel FET 322 is turned on, current flows through the primary side of a transformer 341. During this period, current does not flows through the secondary side of the transformer 341. Thus, energy is accumulated on the secondary side of the transformer 341. When the N-channel FET 322 is turned off, the energy accumulated on the secondary side of the transformer 341 is discharged, and a secondary current flows. Thus, charge is accumulated in a load capacitance 343 via a diode 342.

A terminal on the secondary side of the transformer 341 is provided with an output voltage detection terminal T4. The charge voltage detected by the output voltage detection terminal T4 during each boost operation is supplied to an operational amplifier 321 via charge detection terminal wiring 350. The operational amplifier 321 compares a reference voltage $E_3$ output from a reference power supply 330 with the charge voltage supplied via the charge detection terminal wiring 350. If the charge voltage exceeds the reference voltage $E_3$, the output of the clock signal from the logic circuit 320 is stopped to stop the boost operation. That is, the flyback boost circuit 300 controls the clock signal by detecting the charge voltage of the transformer 341, to thereby prevent the charge voltage (charge) accumulated in the load capacitance 343 from exceeding a predetermined value.

As described above, the related art flyback boost circuit 300 illustrated in FIG. 6 detects the increase of the charge voltage to a predetermined voltage by confirming the rise of the voltage of the output voltage detection terminal T4 to the target voltage, and controls the charge voltage not to exceed a predetermined value.

Further, as another related art example, in the capacitor charging device according to Japanese Unexamined Patent Application Publication No. 2003-59689, a technique is disclosed which provides a charge detection terminal on the output side of a transformer to detect a secondary current of the transformer and control the oscillation mode during the charging operation, to thereby reduce the time loss during the charging time. The above-described related art examples, however, do not disclose a technique of detecting an abnormality of the detection operation by determining the connection (alternatively described as wiring) failure of the output voltage detection terminal T4 or the wiring state of a grounding terminal of a secondary winding of the transformer.

In the flyback boost circuit 300 and the capacitor charging device described above, therefore, the wiring failure of the output voltage detection terminal T4 or the unwired state or the wiring failure of the grounding terminal of the secondary winding of the transformer 341 occurs in some cases due to a mounting failure or the like. In this case, an input voltage is excessively boosted, and the charge voltage exceeds a set value. As a result, disadvantages such as the deterioration of a load device or the like are caused.

SUMMARY OF THE INVENTION

In view of the disadvantages described above, it is desirable in the present invention that a part of a secondary winding or the output of a transformer of a flyback boost circuit is provided with an output voltage detection terminal for detecting an output voltage, and that current is supplied to the transformer via the output voltage detection terminal prior to the start of a boost operation to detect a voltage generated by a resistance component of a connection terminal of the output voltage detection terminal or a grounding terminal of the secondary winding of the transformer, to thereby detect an unwired state by determining whether or not there is terminal floating of the output voltage detection terminal or the grounding terminal of the secondary winding of the transformer. With this configuration, the output voltage is prevented from increasing to an abnormally high voltage, and thus the destruction of a load device is prevented.

A flyback boost circuit according to an embodiment of the present invention includes an output voltage detection terminal provided to a secondary winding of a transformer of the flyback boost circuit and configured to detect an output voltage. Prior to the start of a boost operation, current is supplied to a secondary side of the transformer via the output voltage detection terminal to detect a voltage generated at the output voltage detection terminal, to thereby detect an unwired state by determining whether or not there is floating of the output voltage detection terminal or a grounding terminal of the secondary winding of the transformer.

The flyback boost circuit according to the embodiment of the present invention may include a transistor connected to a primary side of the transformer and configured to generate a primary current by performing a switching operation, a diode connected to an output terminal on the secondary side of the transformer, a load capacitance charged with a voltage output from the diode, a first switch configured to turn on and off a current source which supplies current to the output voltage detection terminal provided to a part of the secondary wiring of the transformer, a reference power supply configured to generate a reference voltage to be compared with the voltage of the output voltage detection terminal, and a control unit configured to control the switching operation of the transistor on the basis of the result of the comparison between the voltage of the output voltage detection terminal and the reference voltage.

A strobe device according to an embodiment of the present invention boosts a voltage by using a flyback boost circuit and supplies the boosted voltage to a discharge tube to drive the discharge tube to emit light. The flyback boost circuit includes an output voltage detection terminal provided to a secondary winding of a transformer of the flyback boost circuit and configured to detect an output voltage. Prior to the start of a boost operation, current is supplied to a part of the secondary winding of the transformer via the output voltage detection terminal to detect a voltage generated at the output voltage detection terminal, to thereby detect an unwired state by determining whether or not there is terminal floating of the output voltage detection terminal or a grounding terminal of the secondary winding of the transformer.

According to the embodiments of the present invention, prior to the start of the boost operation, current is supplied to the secondary winding or a part thereof of the boost transformer via the output voltage detection terminal provided to the secondary side of the transformer. Thereby, whether or not the voltage detected at the output voltage detection terminal is equal to or lower than the reference voltage is detected. If it is found from the result of the detection that the voltage generated at the output voltage detection terminal is higher than the reference voltage, the boost operation is stopped. If the generated voltage is equal to or lower than the reference voltage, the boost operation is started.

The embodiments of the present invention detect whether or not there is terminal floating of the connection terminal of the output voltage detection terminal or the grounding terminal of the secondary winding of the transformer, and stop the boost operation immediately after the detection of a failure in the output voltage detection terminal. Thereby, a trouble can be prevented so as to prevent the deterioration of a load device connected to the output of the transformer.

DESCRIPTION OF THE PREFERRED EMBODIMENTS

Embodiments for implementing the present invention will be described below. Description will be made in the following order: 1. First Embodiment (Flyback Boost Circuit) and 2. First Embodiment (Strobe Device).

1. First Embodiment

Figure 1:
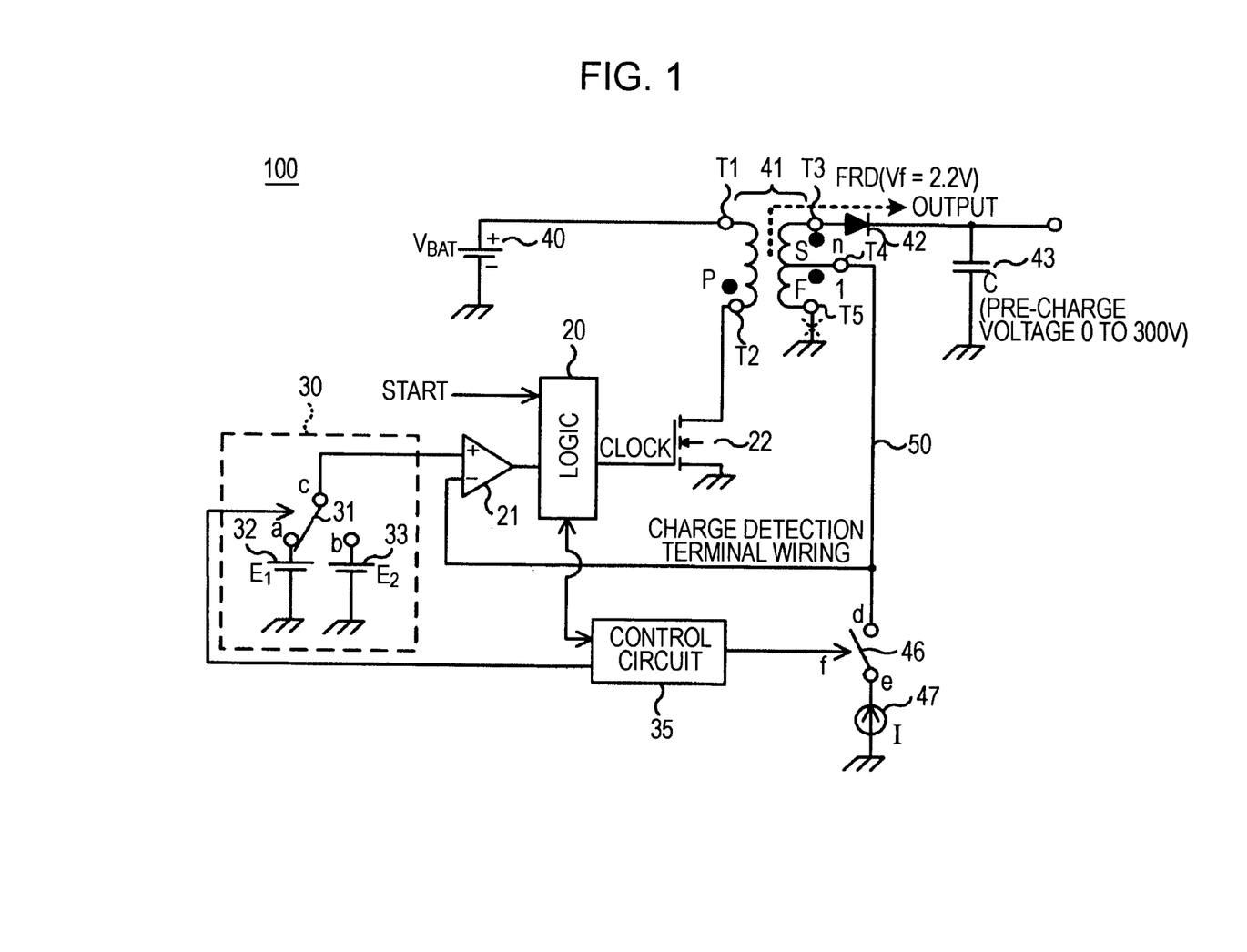
FIG. 1 is a diagram illustrating a circuit configuration of a flyback boost circuit.

Configuration of Flyback Boost Circuit: FIG. 1 illustrates a circuit configuration of a flyback boost circuit 100, which is a first embodiment. The positive terminal of a battery $V_{BAT}$40 is connected to a terminal T1 on the primary side of a boost transformer 41. The negative terminal of the battery $V_{BAT}$40 is connected to a reference potential, e.g., the ground (GND). A terminal T2 on the primary side of the transformer 41 is connected to the drain of an N-channel FET (Field Effect Transistor) 22. The gate of the N-channel FET 22 is connected to a fourth terminal (output terminal) of a logic circuit 20, and the source of the N-channel FET 22 is connected to the ground.

FIG. 1 illustrates an example in which the N-channel FET 22 constitutes a boost switching transistor. Alternatively, an NPN bipolar transistor or the like can also constitute the boost switching transistor. Obviously, therefore, the boost switching transistor is not limited to the above device.

An output terminal T3 on the secondary side of the transformer 41 is connected to the anode of a diode 42. An output voltage detection terminal T4 is provided as a terminal for detecting the output voltage. The output voltage detection terminal T4 is connected to an inverting input terminal (−) of an operational amplifier 21 via one terminal d of a switch SW46 and charge detection terminal wiring (or output voltage detection terminal wiring) 50. A grounding terminal T5 of a secondary winding of the transformer 41 is connected to the ground. The configuration in which the output voltage detection terminal T4 is provided to a part of the secondary winding of the transformer 41 means that the output voltage detection terminal T4 is formed between the output terminal T3 and the grounding terminal T5 of the secondary winding of the transformer 41. That is, the output voltage detection terminal T4 is an extraction terminal according to the turns ratio of the secondary winding of the transformer 41 provided to derive a voltage resulting from the division of the output voltage by a predetermined ratio.

The cathode of the diode 42 is connected to one terminal of a load capacitance 43. The other terminal of the load capacitance 43 is connected to the ground.

As the diode 42, a silicon diffused-junction type high-speed rectifier diode is used, for example. A peak forward voltage $V_{FM}$ of the diode 42 is approximately 2.2 [V], when an average forward current $I_{FM}$ is 0.5 [A], for example. In the following description, the peak forward voltage $V_{FM}$ during the operation of the diode 42 is assumed to be 2.2 [V].

Further, the output voltage detection terminal T4 on the secondary side of the transformer 41 is connected to the one terminal d of the switch SW46. The other terminal e of the switch SW46 is connected to one terminal of a current source 47. The other terminal of the current source 47 is connected to the ground. Further, a control terminal f of the switch SW46 is connected to a first terminal of a control circuit 35.

A third terminal of the control circuit 35 is connected to a third terminal of the logic circuit 20. Further, a second terminal of the control circuit 35 is connected to a control terminal of a signal switching switch SW31 of a reference voltage generation circuit 30.

The reference voltage generation circuit 30 is configured to include the switch SW31 and reference power supplies 32 and 33 for generating reference voltages $E_1$ and $E_2$, respectively. The positive terminal of the reference power supply 32 for generating the reference voltage $E_1$ is connected to a terminal a of the switch SW31, and the negative terminal of the reference power supply 32 is connected to the ground. Further, the positive terminal of the reference power supply 33 for generating the reference voltage $E_2$ is connected to a terminal b of the switch SW31, and the negative terminal of the reference power supply 33 is connected to the ground. Further, a terminal c of the switch SW31 is connected to a non-inverting input terminal (+) of the operational amplifier 21.

The reference voltage $E_1$ is a comparison voltage prior to the start of a boost operation, and the reference voltage $E_2$ is a reference voltage in the boost operation. If the maximum value of the output voltage is set to be 300 [V], for example, the output voltage is divided by the turns ratio into 30.0 [V], for example.

A first terminal of the logic circuit 20 receives an input of a start signal, and a second terminal of the logic circuit 20 is connected to an output terminal of the operational amplifier 21.

In accordance with the start signal, the logic circuit 20 starts to operate. Further, the control circuit 35 outputs to the control terminal of the switch SW31 of the reference voltage generation circuit 30 a control signal for switching the switch.

The operational amplifier 21 compares the detected voltage supplied from the output voltage detection terminal T4 of the transformer 41 with the reference voltage $E_1$ or $E_2$ supplied from the reference voltage generation circuit 30, and outputs a control signal according to the result of the comparison.

If it is found from the comparison result that the detected voltage supplied from the output voltage detection terminal T4 and obtained via the charge detection terminal wiring 50 is higher than the reference voltage $E_1$, the floating of the output voltage detection terminal T4 or the grounding terminal T5 is determined. Then, the operational amplifier 21 outputs a voltage of the "H" level to the second terminal of the logic circuit 20.

Meanwhile, if the detected voltage obtained via the charge detection terminal wiring 50 is equal to or lower than the reference voltage $E_1$, it is determined that the wiring (connection) state of the output voltage detection terminal T4 or the grounding terminal T5 is normal, and thus that there is no terminal floating. In accordance with the result of the determination, the operational amplifier 21 outputs a voltage of the "L" level to the second terminal of the logic circuit 20.

Hereinafter, the wiring state will also be referred to as the connection state, and the term "terminal floating" will refer to a state in which a resistance component is generated due to a poor wiring or connection state.

The reference voltage $E_2$ is supplied to the non-inverting input terminal (+) of the operational amplifier 21 during the boost operation to be compared with the detected voltage detected at the output voltage detection terminal T4. If it is found from the result of the comparison that the detected voltage is equal to or lower than the reference voltage $E_2$, the voltage of the "L" level is output from the output terminal of the operational amplifier 21. If the detected voltage is higher than the reference voltage $E_2$, the voltage of the "H" level is output from the output terminal of the operational amplifier 21.

In accordance with the control signal from the control circuit 35, the reference voltage generation circuit 30 switches the switch SW31 to connect the terminal c to either one of the terminals a and b and output the reference voltage $E_1$ or $E_2$. Prior to the start of the boost operation, the reference voltage generation circuit 30 first outputs the reference voltage $E_1$ to detect whether or not there is terminal floating of the output voltage detection terminal T4 or the grounding terminal T5. Then, if it is determined that there is no terminal floating of the grounding terminal T5, the switch SW31 is switched to output the reference voltage $E_2$ from the reference voltage generation circuit 30.

Prior to the start of the boost operation, the control circuit 35 outputs the control signal to the reference voltage generation circuit 30 to control the switch SW31 to connect the terminals a and c and output the reference voltage $E_1$. Further, at the same time, the control circuit 35 supplies a control signal to the switch SW46 to connect the terminals d and e and supply a current I from the current source 47 to the output voltage detection terminal T4 of the transformer 41.

Further, a control signal indicating that the voltage of the output voltage detection terminal T4 is equal to or lower than a predetermined value is supplied from the third terminal of the logic circuit 20 to the third terminal of the control circuit 35. Then, a control signal for opening the switch SW46 is output from the first terminal of the control circuit 35 to cut off the connection between the terminals d an e. Accordingly, the supply of the current I to the output voltage detection terminal T4 of the transformer 41 is stopped. Further, a control signal for switching from the reference voltage $E_1$ to the reference voltage $E_2$ is output from the second terminal of the control circuit 35 to the switch SW31 of the reference voltage generation circuit 30.

Description of Configuration and Basic Operation of Transformer 41: Subsequently, the configuration and the basic operation of the transformer 41 will be described.

The primary-to-secondary winding ratio $N_{P(S+F)}$ of the transformer 41 is calculated from the following formula. When the drain voltage of the N-channel FET 22 is represented as $V_{dn}$, the ratio $N_{P(S+F)}$ is represented by the following formula so as not to exceed the switch terminal operation condition.

Formula 1

$$N_{P(S+F)} \geq (V_{cap} + V_{FM})/V_{dn} \tag{1}$$

Herein, $V_{FM}$ represents the peak forward voltage of the diode 42, and $V_{cap}$ represents a full-charge voltage accumulated in the main (load) capacitance 43. Further, $N_{P(S+F)}$ represents the primary-to-secondary winding ratio.

In a specific example in which $V_{cap}$ is 300 [V], $V_{FM}$ is 2.2 [V], and $V_{dn}$ is 30 [V], $N_{P(S+F)}$ is represented as $N_{P(S+F)} \approx 10$. That is, the primary-to-secondary turns ratio of the transformer 41 is represented as 1:10.

Subsequently, a secondary winding ratio $N_{SF}$ will be described. The secondary winding ratio $N_{SF}$, which is a parameter for determining the full-charge voltage charged in the load capacitance 43, is represented by the following formula.

Formula 2

$$N_{SF} = (V_{CAP} + V_{FM})/V_{T4} \tag{2}$$

Herein, $V_{FM}$ and $V_{CAP}$ represent the same values as the values in the formula (1), and $V_{T4}$ represents the full-charge voltage at the output voltage detection terminal T4 of the transformer 41.

In a specific example in which $V_{CAP}$ is 300 [V], $V_{FM}$ is 2.2 [V], and $V_{T4}$ is 30 [V], $N_{SF}$ is represented as $N_{SF} \approx 10$. If the turns ratio of the output terminal T3 and the output voltage detection terminal T4 on the secondary side of the transformer 41 in FIG. 1 is represented as n:1, the equation n=9 is obtained.

Subsequently, the inductance value of the primary side on the transformer 41 will be described. When the inductance on the primary side is represented as $L_p$, the value $L_p$ is represented by the following formula.

Formula 3

$$L_p => (V_{T4} * T_{fil}) * N_{SF}/(I_p * N_{P(S+F)}) \tag{3}$$

Herein, the asterisk represents the multiplication sign, and $V_{T4}$, $N_{SF}$, and $N_{P(S+F)}$ represent the same values as the values in the formulae (1) and (2). Further, $T_{fil}$ represents the filter processing time of a not-illustrated filter included in the logic circuit 20.

Description of Operation of Flyback Boost Circuit: With reference to the flowchart of FIG. 2, the operation of the flyback boost circuit 100 illustrated in FIG. 1 will be described.

Figure 2:
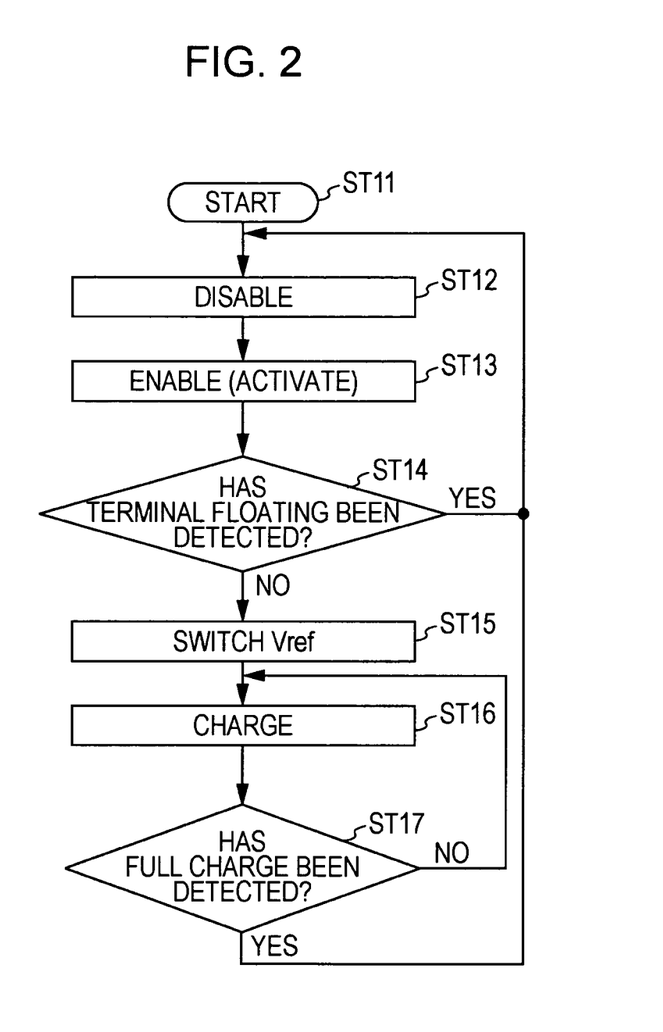
FIG. 2 is a flowchart for explaining the operation of the flyback boost circuit.

At Step ST12, the flyback boost circuit 100 is set in a standby state (disabled). In this process, the battery $V_{BAT}$40 is prevented by a not-illustrated switch from supplying a voltage to the terminal T1 on the primary side of the transformer 41. Further, the logic circuit 20 is not supplied with power yet.

At Step ST13, the system is activated (enabled). Then, the voltage from the above-described battery $V_{BAT}$40 is supplied to the terminal T1 on the primary side of the transformer 41. At the same time, the logic circuit 20, the operational amplifier 21, the control circuit 35, and other circuits are supplied with a voltage, and the respective circuits start to operate.

At Step ST14, a start signal is supplied to the logic circuit 20. Then, a control signal is supplied from the control circuit 35 to the reference voltage generation circuit 30 to switch the switch SW31 and connect the terminals c and a. As a result, the reference voltage $E_1$ (set to be higher than 2.2 [V]) is output from the reference voltage generation circuit 30 and supplied to the non-inverting input terminal (+) of the operational amplifier 21. The value of the reference voltage $E_1$ is not limited to the above value of 2.2 [V]. Thus, it suffices if the reference voltage $E_1$ relies on the peak forward voltage of the diode 42 described above, and the reference voltage $E_1$ varies in accordance with the diode type.

Further, at the same time, a control signal is supplied from the control circuit 35 to the control terminal f of the switch SW46 to connect the terminals d and e. As a result, the current I is supplied from the current source 47 to the output voltage detection terminal T4 on the secondary side of the transformer 41 via the charge detection terminal wiring 50. Thereby, current flows from the output voltage detection terminal T4 to the ground via the grounding terminal T5 for a predetermined time. Further, at the same time, the current I also flows into the load capacitance 43 via the output voltage detection terminal T4, the output terminal T3, and the diode 42 for a predetermined time, depending on the condition of the voltage accumulated in the load capacitance 43 in the initial operation. In the present embodiment, the initial voltage ($V_{CAP}$) of the load capacitance 43 is 0 to 300 [V].

For easier understanding, description will be made below with the omission of a voltage $V_{LS}$ generated in a winding between the output terminal T3 and the output voltage detection terminal T4 of the secondary winding of the transformer 41 and a voltage $V_{LF}$ generated in a winding between the terminals T4 and T5, which are generated when the current I is supplied to the output voltage detection terminal T4.

A connection failure includes a connection failure of the output voltage detection terminal T4 ($R_{T4}$) and a connection failure of the grounding terminal T5 ($R_{T5}$). In an extreme case, the connection completely fails, i.e., disconnection (opening) occurs. The resistance component $R_{T4}$ described above is a resistance generated at the connection point of the output voltage detection terminal T4 and the secondary winding. The resistance component $R_{T5}$ is a resistance generated at the connection point of the grounding terminal T5 and the ground.

If the floating occurs (resistance component is generated) with respect to the ground due to the wiring failure of the output voltage detection terminal T4 or the wiring failure of the grounding terminal T5, and if the current I is supplied to the output voltage detection terminal T4, a voltage is generated due to the resistance component ($R_{T4}$, $R_{T5}$) accompanying the terminal connection failure. Each of the above-described resistance components $R_{T4}$ and $R_{T5}$, which varies depending on the connection state, ranges from 0 to ∞ [Ω], and takes the value of ∞ [Ω] in the opened (disconnected) state. As a result, the voltage detected at each of the output voltage detection terminal T4 and the grounding terminal T5 theoretically ranges from 0 [V] to $(R_{T4}+R_{T5})*I_{47}$ [V].

Description will be first made of the operation performed when the voltage ($V_{CAP}$) accumulated in the load capacitance 43 is 0 [V].

In the output voltage detection terminal T4, a voltage of $(R_{T4}+R_{T5})*I$ [V] is generated. When the generated voltage is equal to or lower than $V_{FM}(2.2 [V])+V_{CAP}(0 [V])$, the diode 42 is brought into an electrically non-conductive state. Then, the voltage detected at the output voltage detection terminal T4 is supplied to the inverting input terminal (−) of the operational amplifier 21. If the voltage detected at the output voltage detection terminal T4 is equal to or lower than the reference voltage $E_1$, it is determined that there is no disconnection. Therefore, the procedure proceeds to Steps ST15 and ST16 to start the charging operation.

Meanwhile, if the output voltage detection terminal T4 or the grounding terminal T5 is in a poor wiring state, the resistance value ($R_{T4}+R_{T5}$) is increased. If the voltage ($R_{T4}+R_{T5}$)*I [V] detected at the output voltage detection terminal T4 exceeds the voltage of $V_{FM}(2.2 [V])+V_{CAP}(0 [V])$, the diode 42 is brought into an electrically conductive state. Further, the voltage generated at the output voltage detection terminal T4 is supplied to the inverting input terminal (−) of the operational amplifier 21.

If the voltage supplied to the inverting input terminal (−) of the operational amplifier 21 is higher than the reference voltage $E_1$, the logic circuit 20 is controlled accordingly, and the operation of starting the next charging operation is stopped on the basis of the assumption that the output voltage detection terminal T4 or the grounding terminal T5 has been disconnected.

Subsequently, description will be made of the operation performed when the voltage ($V_{CAP}$) of the load capacitance 43 ranges from 0 [V] to 300 [V], for example. Similarly to the above-described example, description will be made of a case in which the resistance component ($R_{T4}+R_{T5}$) is small due to a good wiring state of the output voltage detection terminal T4 or the grounding terminal T5. Each of the voltages from $V_{FM}(2.2 [V])+V_{CAP}(0 [V])$ to $V_{FM}(2.2 [V])+V_{CAP}(300 [V])$ is equal to or lower than the voltage of $(R_{T4}+R_{T5})*I$ [V]. Therefore, the diode 42 is brought into an electrically non-conductive state.

Meanwhile, if the grounding terminal T5 is in a poor wiring state and thus is disconnected, for example, a comparison result opposite to the above-described comparison result is obtained, and the diode 42 is brought into the electrically conductive state.

Therefore, if the voltage at the inversing input terminal (−) of the operational amplifier 21 is higher than the reference voltage $E_1$ supplied to the non-inverting input terminal (+), a voltage of the "L" level is output from the output terminal of the operational amplifier 21 to the logic circuit 20. That is, in this case, it is determined that there is terminal floating or disconnection of the output voltage detection terminal T4 or the grounding terminal T5. Therefore, the procedure proceeds to Step ST12 to stop the operation of starting the boost operation of the flyback boost circuit 100.

The description so far has been made with the omission of the voltages $V_{LS}$ and $V_{LF}$ generated between the respective terminals (between T3 and T4 and between T4 and T5) on the secondary side of the transformer 41. To be precise, however, these voltages should be taken into account. In this case, the reference voltage $E_1$ should be set to be higher than the peak forward voltage $V_{FM}(2.2 [V])$ of the diode 42, even when the voltage $V_{CAP}$ is at the lowest level (0 [V]).

Subsequently, description will be made of the operation performed when the output voltage detection terminal T4 of the secondary winding of the transformer 41 is wired and the grounding terminal T5 is normally wired to the ground.

If the wiring of the output voltage detection terminal T4 is normal, and if the wiring between the terminal T5 of the transformer 41 and the ground is normal, the resistance value ($R_{T4}+R_{T5}$) can be ignored. Therefore, even if current is applied to the output voltage detection terminal T4, no voltage is generated, or a voltage of a predetermined value or lower is generated.

Further, if the initial voltage ($V_{CAP}$) of the load capacitance 43 is in the range from 0 [V] to 300 [V], as described above, each of the voltages from $V_{FM}(2.2 [V])+V_{CAP}(0 [V])$ to $V_{FM}$ (2.2 [V])+$V_{CAP}$(300 [V]) is compared with the voltage of ($R_{T4}$+$R_{T5}$)*I [V], for example.

In this case, the voltage detected at the output voltage detection terminal T4 is ($R_{T4}$+$R_{T5}$)*I [V], which is equal to or lower than the output voltage $V_{FM}$(2.2 [V])+$V_{CAP}$(0 [V]) to $V_{FM}$(2.2 [V])+$V_{CAP}$(300 [V]) of the diode 42. Therefore, the diode 42 is turned off, and the current I flows from the output voltage detection terminal T4 to the ground via the grounding terminal T5 for a predetermined time.

As a result, the voltage detected at the output voltage detection terminal T4 is input to the inverting input terminal (−) of the operational amplifier 21. The input voltage is equal to or lower than the reference voltage $E_1$. Then, a voltage of the "H" level is output from the output terminal of the operational amplifier 21 to the logic circuit 20. That is, in this case, it is determined that the charge detection terminal wiring 50 and the output voltage detection terminal T4 are normally wired, and the procedure proceeds to Step ST15.

At Step ST15, the control circuit 35 supplies a control signal to the switch SW46 to cut off the connection between the terminals d and e. The control circuit 35 also supplies a control signal to the switch SW31 of the reference voltage generation circuit 30 to connect the terminals c and b. As a result, the reference voltage $E_2$, e.g., 30.0 [V], is output from the output terminal of the reference voltage generation circuit 30 and supplied to the non-inverting input terminal (+) of the operational amplifier 21. In the flowchart of FIG. 2, the switching from the reference voltage $E_1$ to the reference voltage $E_2$ is simply described as "SWITCH Vref" in the drawing.

At Step ST16, the logic circuit 20 supplies a clock signal to the gate of the N-channel FET 22. The N-channel FET 22 performs an ON operation during the "H" level period of the clock signal. Thereby, a switching current flows from the battery $V_{BAT}$40 to the terminals T1 and T2 on the primary side of the transformer 41, and then to the ground via the drain and the source of the N-channel FET 22.

If an "L" level voltage of the clock signal is supplied from the logic circuit 20 to the gate of the N-channel FET 22, the operation of the N-channel FET 22 is turned off, and the switching operation is stopped.

During the OFF period of the N-channel FET 22, the energy accumulated in the transformer 41 is discharged, and a secondary current flows into the ground via the output terminal T3 and the grounding terminal T5. Thereby, charge is accumulated in the load capacitance 43.

Further, in this process, the detected voltage detected at the output voltage detection terminal T4 is supplied to the inverting input terminal (−) of the operational amplifier 21 via the charge detection terminal wiring 50 connected to the output voltage detection terminal T4.

The detected voltage supplied to the inverting input terminal (−) is compared with the reference voltage $E_2$. If the detected voltage is equal to or lower than the reference voltage $E_2$, a voltage of the "H" level is output from the operational amplifier 21 and supplied to the logic circuit 20. Then, the logic circuit 20 outputs the clock signal to the gate of the N-channel FET 22.

At Step ST17, on the basis of the result of the comparison performed at the operational amplifier 21, whether the detected voltage detected at the output voltage detection terminal T4 is higher or equal to or lower than the reference voltage $E_2$ is detected. If the detected voltage is equal to or lower than the reference voltage $E_2$, the procedure proceeds to Step ST16 to repeat the charging operation.

Meanwhile, if the detected voltage detected at the output voltage detection terminal T4 exceeds the reference voltage $E_2$ of 30.0 [V] as a result of the repeated charging operation, it is determined that the load capacitance 43 has been charged with the full-charge voltage, which is a predetermined voltage (described as "HAS FULL CHARGE BEEN DETECTED?" in Step ST16 of FIG. 2). Then, the procedure proceeds to Step ST12 to stop (disable) the charging operation. Thereafter, similar operation is repeated.

Description of Charging Operation of Flyback Boost Circuit: Subsequently, the charging operation will be described in detail with reference to FIG. 1 and FIG. 3 illustrating an operation timing chart of the flyback boost circuit 100.

At the time t1, power is supplied to the respective circuits of the flyback boost circuit 100. At the time t2, the voltage supplied to the logic circuit 20, the reference voltage generation circuit 30, the control circuit 35, and so forth is stabilized.

Figure 3:
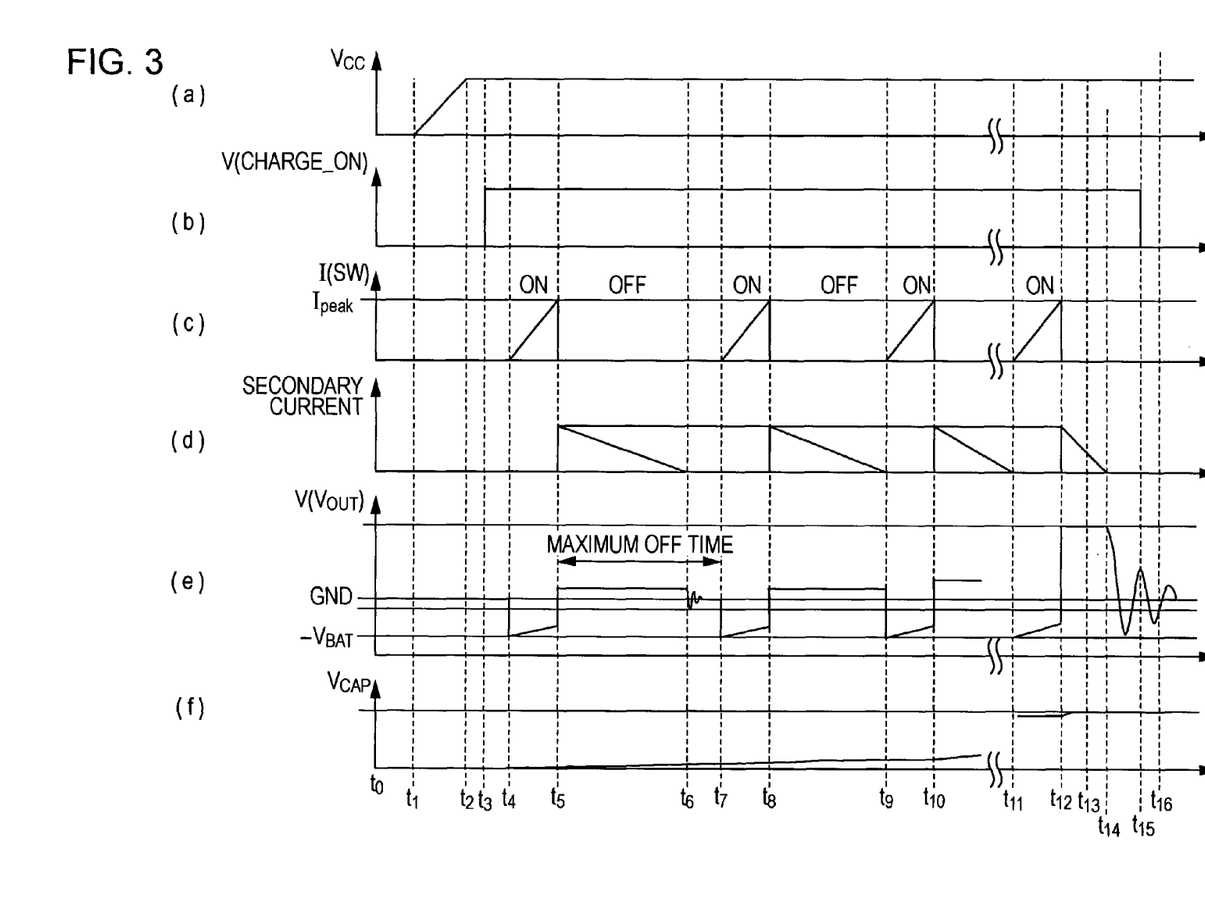
FIG. 3 is a timing chart for explaining the operation of the flyback boost circuit.

During the period between the times t2 and t3, a detection operation is performed to detect whether or not there is floating of the output voltage detection terminal T4 or the grounding terminal T5 of the secondary winding (see (a) of FIG. 3).

If the terminal floating is detected, a V(CHARGE_ON) signal, which is the start signal, maintains the "L" level (see (b) of FIG. 3). If the terminal floating is not detected, it is determined that the connection (wiring) of the output voltage detection terminal T4 of the transformer 41 or the connection (wiring) of the grounding terminal T5 is normal, and thus that the voltage charged in the load capacitance 43 can be normally measured. Then, the switching operation of the N-channel FET 22 is started.

The above-described detection of the terminal floating of the output voltage detection terminal T4 or the grounding terminal T5 of the secondary winding of the transformer 41 is performed on the basis of the comparison by the operational amplifier 21 between the detected voltage detected at the output voltage detection terminal T4 and the reference voltage $E_1$ generated at the reference voltage generation circuit 30. The operation of detecting the terminal floating of the output voltage detection terminal T4 has already been described in detail. Thus, description thereof will be omitted.

As a result of the operation of detecting the terminal floating of the output voltage detection terminal T4 or the grounding terminal T5 of the secondary winding of the transformer 41, the terminal floating is not detected, and it is determined that the normal detection operation will be performed. Accordingly, a control signal is supplied from the control circuit 35 to the reference voltage generation circuit 30 to switch the switch SW31 and output the reference voltage $E_2$ from the reference voltage generation circuit 30.

At the time t3, at which the boost operation starts, the V(CHARGE_ON) signal serving as the start signal rises to the "H" level, and a voltage of the "H" level is supplied to the logic circuit 20. The logic circuit 20 performs such processes as a logic operation and a delay operation.

During the period between the times t4 and t5, the clock signal is at the "H" level, and the "H" level voltage of the clock signal is supplied from the logic circuit 20 to the gate of the N-channel FET 22. Then, the N-channel FET 22 is turned on, and a primary current flows from the battery $V_{BAT}$40 to the reference potential, e.g., the ground, via the terminals T1 and T2 on the primary side of the transformer 41 and then via the drain and the source of the N-channel FET 22. The primary current corresponds to a peak current $I_{peak}$ having a triangular waveform, which increases over time during the period between the times t4 and t5 (see (c) of FIG. 3).

Therefore, an induced voltage is generated between the output terminal T3 and the grounding terminal T5 of the secondary winding of the transformer 41. Due to the polarity of the diode 42, however, a current flow is prevented. Thus, there is no induced current flowing from the transformer 41, and energy is accumulated in the transformer 41. The accumulation of the energy by the transformer 41 is performed during the period between the times t4 and t5.

At the time t5, the clock signal output from the logic circuit 20 falls to the "L" level. Then, a voltage of the "L" level is supplied to the gate of the N-channel FET 22, and the N-channel FET 22 is turned off. As a result, the primary current flowing from the transformer 41 to the ground via the N-channel FET 22 is cut off.

The N-channel FET 22 is in the OFF state during the period between the times t5 and t6. Therefore, the energy accumulated on the primary side of the transformer 41 is discharged. Accordingly, the secondary current flows to the secondary side of the transformer 41, and charge (or current) is accumulated in the load capacitance 43 via the diode 42 (see (d) of FIG. 3).

At the time t6, the detected voltage detected at the output voltage detection terminal T4 on the secondary side of the transformer 41 is supplied to the inverting input terminal (−) of the operational amplifier 21 via the charge detection terminal wiring 50, and is compared with the reference voltage $E_2$, e.g., 30.0 [V]. At the time t6, the detected voltage detected at the output voltage detection terminal T4 is equal to or lower than the reference voltage. Therefore, a voltage of the "H" level is output from the operational amplifier 21 to the logic circuit 20, and the clock signal continues to be output from the logic circuit 20 (see (e) of FIG. 3).

In FIG. 3, (f) shows a voltage waveform chart obtained when the secondary current flows through the transformer 41 during the period between the times t5 and t6 and resultantly charge is accumulated in the load capacitance 43.

Thereafter, the N-channel FET 22 similarly repeats the ON-OFF operation in accordance with the "H" level voltage and the "L" level voltage of the clock signal.

During the period between the times t7 and t8, the N-channel FET 22 is in the ON state. Therefore, the primary current flows through the transformer 41, and energy is accumulated. During the period between the times t8 and t9, the N-channel FET 22 is in the OFF state. Therefore, the secondary current flows through the secondary side of the transformer 41, and charge is further charged in the load capacitance 43. As a result, the charge is added to the charge voltage at the time t6, and the voltage is boosted.

At the time t9, the boosted charge voltage is supplied to the inverting input terminal (−) of the operational amplifier 21 via the output voltage detection terminal T4 and the charge detection terminal wiring 50, and is compared with the reference voltage $E_2$.

At the time t9, the voltage detected at the output voltage detection terminal T4 is lower than the reference voltage $E_2$. Therefore, the boost operation continues.

Thereafter, similar operation is repeated. When the voltage detected at the output voltage detection terminal T4 exceeds the reference voltage $E_2$ in the period between the times t12 and t14, a voltage of the "L" level is output from the operational amplifier 21 and supplied to the logic circuit 20. Then, the logic circuit 20 stops generating or outputting the clock signal supplied to the gate of the N-channel FET 22.

At the time t15, the V(CHARGE_ON) signal as the start signal output from the control circuit 35 shifts from the "H" level to the "L" level. As a result, a sequence of operations forming the subsequent boost operation is stopped.

Figure 4:
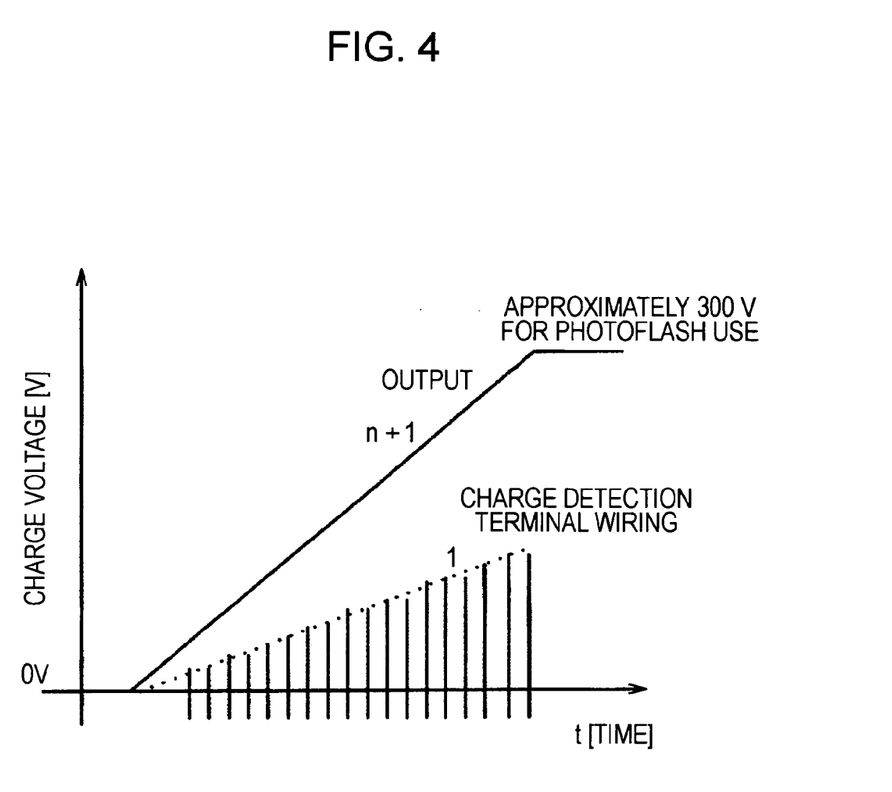
FIG. 4 is a characteristic diagram illustrating the operation of the flyback boost circuit.

FIG. 4 illustrates voltage waveforms over time of the voltage detected at the output voltage detection terminal T4 on the secondary side of the transformer 41 and the voltage accumulated in the load capacitance 43.

FIG. 4 illustrates an example of the output voltage, wherein the winding between the output voltage detection terminal T4 and the grounding terminal T5 on the secondary side of the transformer 41 is represented as 1, and the turns ratio between the output terminal T3 and the output voltage detection terminal T4 is represented as n. That is, as the voltage detected at the output voltage detection terminal T4, a voltage of 1/(n+1) is detected with respect to the voltage generated at the output terminal T3. If the value n is 9, for example, the voltage output from the output voltage detection terminal T4 is one tenth of the output voltage.

In FIG. 4, the output voltage represents the charge voltage of the load capacitance 43. The maximum value of the charge voltage (full-charge voltage) of the load capacitance 43 is approximately 300 [V], for example, for photoflash use. The charge voltage starts to increase over time at a predetermined time. Thereby, the voltage is boosted. Further, the waveform of the voltage detected at the output voltage detection terminal T4 shows the voltage detected immediately before the start of the ON operation after the turn-off of the N-channel FET 22 in accordance with the clock signal. The maximum value of the voltage is approximately 30.0 [V].

In a flyback boost circuit, when a voltage is detected on the secondary side of the transformer 41 or at the output terminal, if a wiring failure occurs in the output voltage detection terminal T4 or between the grounding terminal T5 and the ground, the flyback boost circuit becomes unable to control the voltage. At worst, a device connected to the output terminal on the secondary side of the transformer 41 is applied with a high voltage, and a reliability issue arises.

Meanwhile, according to the embodiment of the present invention, the presence or absence of the terminal floating is detected prior to the start of the boost operation, as described above, to thereby prevent the boost operation from being performed when the wiring failure of the output voltage detection terminal T4 or the terminal floating of the grounding terminal T5 is detected. Accordingly, the generation of an uncontrollable high voltage can be prevented.

As obvious from the above description, the technical concept according to the embodiment of the present invention is not limited to the flyback boost circuit, but can be applied to all power supply circuits in which an output voltage detection terminal for detecting the output voltage is separately provided. Accordingly, it is possible to prevent reliability issues such as the destruction and the heat generation occurring in a stage subsequent to the power supply circuit, which are attributed to the wiring failure of the output voltage detection terminal T4 for detecting the output voltage or the terminal floating (wiring failure) of the grounding terminal T5.

2. Second Embodiment

Figure 5:
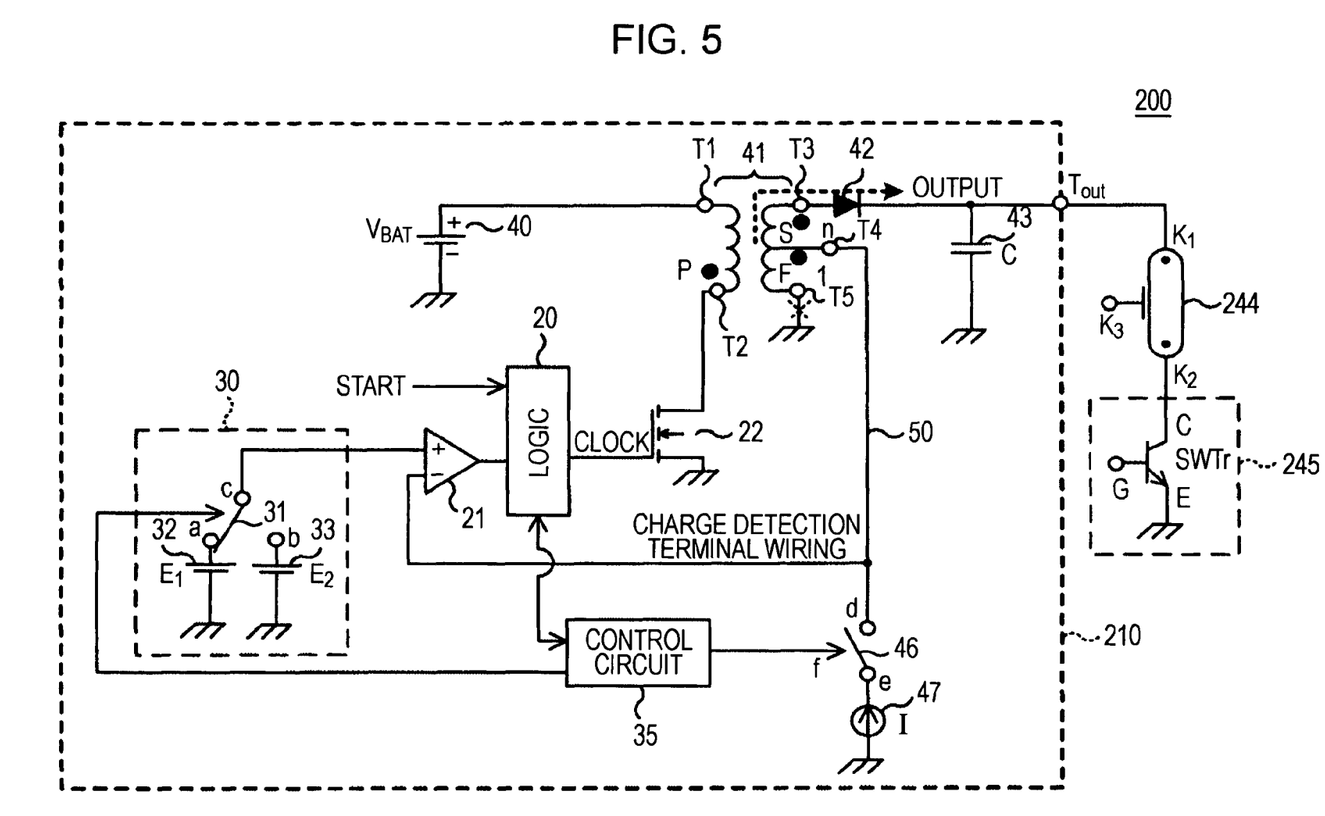
FIG. 5 is a circuit diagram of a main part for driving a strobe device.

Configuration of Main Part of Strobe Device: FIG. 5 illustrates a configuration of a main part of a strobe device 200 using a flyback boost circuit, which is a second embodiment.

A flyback boost circuit 210 enclosed by a broken line in FIG. 5 is the same in circuit configuration as the flyback boost circuit 100 illustrated in FIG. 1. Thus, description of the configuration and operation of the flyback boost circuit 210 will be omitted here.

An output terminal $T_{out}$ of the flyback boost circuit 210 is connected to a discharge tube, e.g., one terminal $K_1$ of a xenon tube 244. The other terminal $K_2$ of the xenon tube 244 is connected to a collector of a switching transistor SWTr245. A control terminal of the switching transistor SWTr245 is supplied with a control signal for controlling the light emission of the xenon tube 244, and an emitter of the switching transistor SWTr245 is connected to the ground as a reference potential. Further, a control terminal $K_3$ of the xenon tube 244 is connected to the collector of the switching transistor SWTr245 via a not-illustrated transformer, for example.

As the switching transistor SWTr245, an IGBT (Insulating Gate Bipolar Transistor) is used, for example. The insulating gate bipolar transistor is a power transistor including an input portion having a MOS (Metal Oxide Semiconductor) structure and an output portion having a bipolar structure. The transistor is a high-voltage semiconductor suitable for high current, which controls high power by using small driving power.

Description of Operation of Strobe Device: The flyback boost circuit 210 enclosed by the broken line in FIG. 5 performs an operation similar to the operation illustrated in FIG. 1. Thus, description of the operation will be omitted.

After the supply of a power supply voltage to the respective circuits, and before the supply of the V(CHARGE_ON) signal to the logic circuit 20 as the start signal for starting the boost operation, the connection (wiring) state of the output voltage detection terminal T4 for detecting a part of the output voltage of the transformer 41 and the charge detection terminal wiring 50 and the wiring state of the grounding terminal T5 of the secondary winding of the transformer 41 are determined. If the wiring state of the output voltage detection terminal T4 or the wiring state of the grounding terminal T5 and the ground is insufficient and thus the terminal is floating or disconnected, the voltage at the inverting input terminal (−) of the operational amplifier 21 exceeds the reference voltage $E_1$. As a result, the operation of starting the subsequent boost operation is stopped.

Meanwhile, if the voltage at the inverting input terminal (−) of the operational amplifier 21 is equal to or lower than the reference voltage $E_1$, it is determined that the wiring of the output voltage detection terminal T4 and the wiring between the grounding terminal T5 and the ground are normal, and thus that the output voltage of the transformer 41 can be measured. Then, the subsequent boost operation according to the switching operation of the N-channel FET 22 starts.

If the absence of the terminal floating is determined, the flyback boost circuit 210 repeats the boost operation. Then, if the voltage at the output terminal $T_{out}$ exceeds approximately 300 [V], a gate control signal for controlling a gate G of the switching transistor SWTr245 is generated by a flash-on signal and another control signal. The gate control signal is input to the gate G of the switching transistor SWTr245, and the ON operation is performed. Accordingly, the terminals $K_2$ and $K_3$ of the xenon tube 244 are driven to emit light. Thereby, a flash operation is performed.

As described above, the flyback boost circuit 210 of the strobe device 200 is provided with means for determining the wiring state of the output voltage detection terminal T4 for detecting the output voltage of the transformer 41 and the wiring state of the grounding terminal T5 of the secondary winding of the transformer 41. As a result, it is possible to accurately measure the charge voltage charged in the load capacitance 43 on the secondary side of the transformer 41, and thus to prevent the charge voltage from exceeding a predetermined voltage. Therefore, a device connected to the output side of the transformer 41 is not applied with a high voltage higher than a predetermined value. Accordingly, it is possible to prevent the destruction or deterioration of the device, and thus to improve the reliability of the device.

In the embodiments of the present invention, a transformer corresponds to the transformer 41. A transistor connected to a primary side of the transformer and configured to generate a primary current by performing a switching operation corresponds to the N-channel FET 22. A diode connected to an output terminal on a secondary side of the transformer corresponds to the diode 42. A load capacitance charged with a voltage output from the diode corresponds to the load capacitance 43. A first switch configured to turn on and off a current source which supplies current to the output voltage detection terminal provided to a part of a secondary winding of the transformer corresponds to the switch SW46. A reference power supply configured to generate a reference voltage to be compared with the voltage of the output voltage detection terminal corresponds to the reference voltage generation circuit 30. A control unit configured to control the switching operation of the transistor on the basis of the result of the comparison between the voltage of the output voltage detection terminal and the reference voltage corresponds to the logic circuit 20.

The present application contains subject matter related to that disclosed in Japanese Priority Patent Application JP 2008-228320 filed in the Japan Patent Office on Sep. 5, 2008 and Japanese Priority Patent Application JP 2009-049569 filed in the Japan Patent Office on Mar. 3, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A flyback boost circuit comprising:
   a transformer having a primary winding and a secondary winding, the secondary winding including
      an output terminal,
      an output voltage detection terminal configured to detect an output voltage, and
      a grounding terminal,
   a transistor connected to a primary side of the transformer and configured to generate a primary current by performing a switching operation,
   a control unit configured to control the switching operation of the transistor according to a result from comparing the output voltage to a reference voltage;
   wherein, prior to the start of a boost operation, the primary current is supplied to a secondary side of the transformer via the output voltage detection terminal to detect the output voltage, to thereby detect an unwired state by determining whether or not there is floating of the output voltage detection terminal or the grounding terminal.

2. The flyback boost circuit according to claim 1,
   wherein the output voltage detection terminal is provided to a part of the secondary winding of the transformer, and detects a voltage proportional to the output voltage on the secondary side of the transformer.

3. The flyback boost circuit according to claim 2, further comprising:
   a diode connected to the output terminal;
   a load capacitance charged with a voltage output from the diode;
   a first switch configured to turn on and off a current source which supplies current to the output voltage detection terminal, the output voltage detection terminal being located between the output terminal and the grounding terminal;
   a reference power supply configured to generate the reference voltage.

4. The flyback boost circuit according to claim 3,
   wherein, when the voltage of the output voltage detection terminal exceeds the reference voltage, the control unit stops the switching operation of the transistor and determines that a terminal of the output voltage detection terminal or the grounding terminal of the secondary winding of the transformer has been disconnected.

5. The flyback boost circuit according to claim 3, wherein the reference voltage is one of a plurality of reference voltages.

6. The flyback boost circuit according to claim 5, wherein the reference power supply includes a second switch configured to selectively generate the plurality of reference voltages.

7. The flyback boost circuit according to claim 3, wherein, prior to the start of the switching operation by the transistor, the first switch is brought into an electrically conductive state to supply the current from the current source to the output voltage detection terminal.

8. The flyback boost circuit according to claim 6, wherein the second switch derives a first voltage when the first switch is in an OFF state, and derives a second voltage when the first switch is in an ON state.

9. The flyback boost circuit according to claim 8, wherein the first voltage is higher than a peak forward voltage of the diode.

10. A strobe device that boosts a voltage by using a flyback boost circuit and supplies a boosted voltage to a discharge tube to drive the discharge tube to emit light,
wherein the flyback boost circuit includes an output voltage detection terminal provided to a secondary winding of a transformer of the flyback boost circuit and configured to detect an output voltage, and
wherein, prior to the start of a boost operation, current is supplied to a part of the secondary winding of the transformer via the output voltage detection terminal to detect a voltage generated at the output voltage detection terminal, to thereby detect an unwired state by determining whether or not there is terminal floating of the output voltage detection terminal or a grounding terminal of the secondary winding of the transformer.

11. The strobe device according to claim 10, wherein the output voltage detection terminal is provided to a part of the secondary winding of the transformer, and detects a voltage proportional to the output voltage on a secondary side of the transformer.

12. The strobe device according to claim 10, wherein the flyback boost circuit includes
a transistor connected to a terminal of a primary winding of the transformer and configured to generate a primary current by performing a switching operation,
a diode connected to an output terminal on the secondary side of the transformer,
a load capacitance charged with a voltage output from the diode,
a first switch configured to turn on and off a current source which supplies current to the output voltage detection terminal provided to the part of the secondary winding of the transformer, the output voltage detection terminal being located between the output terminal and the grounding terminal,
a reference power supply configured to generate a reference voltage to be compared with the voltage of the output voltage detection terminal, and
a control unit configured to control the switching operation of the transistor on the basis of the result of the comparison between the voltage of the output voltage detection terminal and the reference voltage.

13. The strobe device according to claim 12, wherein, when the voltage of the output voltage detection terminal exceeds the reference voltage, the control unit stops the switching operation of the transistor and determines that a terminal of the output voltage detection terminal or the grounding terminal of the secondary winding of the transformer has been disconnected.

14. The strobe device according to claim 13, wherein the reference voltage is higher than a peak forward voltage of the diode.

15. The strobe device according to claim 12, wherein the reference voltage is one of a plurality of reference voltages, wherein the reference power supply includes a second switch configured to selectively generate the plurality of reference voltages.

16. The strobe device according to claim 12, wherein the second switch derives a first voltage when the first switch is in an OFF state, and derives a second voltage when the first switch is in an ON state.

17. The strobe device according to claim 12, wherein the first voltage is higher than a peak forward voltage of the diode.

\* \* \* \* \*